US006551474B1

(12) United States Patent
Andrews et al.

(10) Patent No.: US 6,551,474 B1
(45) Date of Patent: Apr. 22, 2003

(54) GENERATION AND DELIVERY DEVICE FOR OZONE GAS AND OZONE DISSOLVED IN WATER

(75) Inventors: Craig C. Andrews, College Station; Thomas D. Rogers, Wheelock; Oliver J. Murphy, Bryan, all of TX (US)

(73) Assignee: Lynntech International Ltd., College Station, TX (US)

( * ) Notice: Subject to any disclaimer, the term of this patent is extended or adjusted under 35 U.S.C. 154(b) by 0 days.

(21) Appl. No.: 09/383,548

(22) Filed: Aug. 26, 1999

Related U.S. Application Data

(63) Continuation of application No. 08/829,604, filed on Mar. 31, 1997, now Pat. No. 5,989,407.

(51) Int. Cl.[7] .................................................. C25B 9/00
(52) U.S. Cl. ........................................ 204/266; 55/318
(58) Field of Search ......................... 204/266; 55/318

(56) References Cited

U.S. PATENT DOCUMENTS

| | | | |
|---|---|---|---|
| 3,742,301 A | 6/1973 | Burris | 317/4 |
| 3,823,728 A | 7/1974 | Burris | 137/8 |
| 4,019,986 A | 4/1977 | Burris | 210/139 |
| 4,214,969 A | 7/1980 | Lawrance | 204/255 |
| 4,316,782 A | 2/1982 | Foller | 204/129 |
| 4,375,395 A | 3/1983 | Foller | 204/129 |
| 4,416,747 A | 11/1983 | Menth | 204/129 |
| 4,417,969 A | 11/1983 | Ezzell | 204/252 |
| 4,541,989 A | 9/1985 | Foller | 422/186.07 |
| 4,555,335 A | 11/1985 | Burris | 210/192 |
| 5,759,849 A | 7/1988 | Banmann | 210/652 |
| 4,792,407 A | 12/1988 | Zeff | 210/748 |
| 4,876,115 A | 10/1989 | Raistrick | 427/115 |
| 4,927,800 A | 5/1990 | Nishiki | 502/349 |
| 4,950,371 A | 8/1990 | McElroy | 204/129 |
| 4,992,126 A | 2/1991 | Door | 156/182 |
| 5,097,556 A | 3/1992 | Engel | 8/158 |
| 5,114,549 A | 5/1992 | Shimamune | 204/149 |
| 5,242,764 A | 9/1993 | Dhar | 429/30 |
| 5,246,792 A | 9/1993 | Watanabe | 429/33 |
| 5,290,406 A | 3/1994 | Sawamoto | 204/101 |
| 5,385,711 A | 1/1995 | Baker | 422/186.07 |
| 5,427,658 A | 6/1995 | Allen | 204/95 |
| 5,460,705 A | 10/1995 | Murphy | 204/252 |
| 5,529,683 A | 6/1996 | Critz | 205/350 |
| 5,578,280 A | 11/1996 | Kazi | 422/186.07 |
| 5,578,388 A | 11/1996 | Faita | 429/30 |
| 5,607,562 A | 3/1997 | Shimamune | 204/265 |
| 5,626,769 A | 5/1997 | Sawamoto | 210/760 |
| 5,686,051 A | 11/1997 | Shiota | 422/186.14 |
| 5,997,702 A | 12/1999 | Koganezawa | 204/260 |

FOREIGN PATENT DOCUMENTS

EP    0 342 169    11/1989

OTHER PUBLICATIONS

Pallav Tatapudi, Synthesis of Hydrogen Peroxide in a Proton Exchange Membrane Electrochemical Reactor, Apr. 1993, pp. L55–L57.

Pallav Tatapudi, Simultaneous Synthesis of Ozone and Hydrogen Peroxide in a Proton–Exchange–Membrane Electrochemical Reactor, May 1994, pp. 1174–1178.

(List continued on next page.)

*Primary Examiner*—Kishor Mayekar
(74) *Attorney, Agent, or Firm*—Streets & Steele; Jeffrey L. Streets

(57) ABSTRACT

The present invention provides an ozone generation and delivery system that lends itself to small scale applications and requires very low maintenance. The system includes an anode reservoir and a cathode phase separator each having a hydrophobic membrane to allow phase separation of produced gases from water. The system may be configured to operate passively with no moving parts or in a self-pressurizing manner with the inclusion of a pressure controlling device or valve in the gas outlet of the anode reservoir. The hydrogen gas, ozone gas and water containing ozone may be delivered under pressure.

29 Claims, 6 Drawing Sheets

OTHER PUBLICATIONS

Tom D. Rogers, Water Purification, Microbiological Control, Sterilization and Organic Waste Decomposition Using an Electrochemical Advanced Ozonation Process, 9 pages, Jul. 13–16, 1992.

G. Duncan Hitchens, Development of a Proton–Exchange Membrane Electrochemical Reclaimed Water Post–Treatment System, pp. 131–140, Jul. 15–18, 1991.

Masahiro Waatanabe, Management of the Water Content in Polymer Electrolyte Membranes with Porous Fiber Wicks, pp. 3190–3193, Nov. 1993.

Pallav Tatpudi, Synthesis of Ozone in a Proton Exchange Membrane Electrochemical Reactor, pp. 3527–3530, Dec. 1993.

Pallav Tatapudi, Paired Synthesis of Ozone and Hydrogen Peroxide in an Electrochemical Reactor, pp. 275–285, (no date available).

GENERATION AND DELIVERY DEVICE FOR OZONE GAS AND OZONE DISSOLVED IN WATER

This is a continuation of application Ser. No. 08/829,604 filed on Mar. 31, 1997, now U.S. Pat. No. 5,989,407.

BACKGROUND OF THE INVENTION

This invention was made with Government support under contract NAS9 97023 awarded by NASA. The Government has certain rights in this invention.

1. Field of the Invention

This invention relates to the production and delivery of ozone in highly concentrated forms, both in high weight percent gas and high levels of ozone dissolved in water. More specifically, the invention relates to an electrochemical system capable of efficiently generating even small amounts of ozone.

2. Background of the Related Art

Ozone has long been recognized as a useful chemical commodity valued particularly for its outstanding oxidative activity. Because of this activity, it finds wide application in disinfection processes. In fact, it kills bacteria more rapidly than chlorine, it decomposes organic molecules, and removes coloration in aqueous systems. Ozonation removed cyanides, phenols, iron, manganese, and detergents. It controls slime formation in aqueous systems, yet maintains a high oxygen content in the system. Unlike chlorination, which may leave undesirable chlorinated organic residues in organic containing systems, ozonation leaves fewer potentially harmful residues. Ozone has also been shown to be useful in both gas and aqueous phase oxidation reactions which may be carried out by advanced oxidation processes (AOPs) in which the formation of OH• radicals is enhanced by exposure to ultraviolet light. Certain AOPs may even involve a catalyst surface, such as a porous titanium dioxide photocatalyst, that further enhances the oxidation reaction. There is even evidence that ozone will destroy viruses. Consequently, it is used for sterilization in the brewing industry and for odor control in sewage treatment and manufacturing. Ozone may also be employed as a raw material in the manufacture of certain organic compounds, e.g., oleic acid and peroxyacetic acid.

Thus, ozone has widespread application in many diverse activities, and its use would undoubtedly expand if its cost of production could be reduced. For many reasons, ozone is generally manufactured on the site where it is used. However, the cost of generating equipment, and poor energy efficiency of production has deterred its use in many applications and in many locations.

On a commercial basis, ozone is currently produced by the silent electric discharge process, otherwise known as corona discharge, wherein air or oxygen is passed through an intense, high frequency alternating current electric field. The corona discharge process forms ozone through the following reaction:

Yields in the corona discharge process generally are in the vicinity of 2% ozone, i.e., the exit gas may be about 2% $O_3$ by weight. Such $O_3$ concentrations, while quite poor in an absolute sense, are still sufficiently high to furnish usable quantities of $O_3$ for the indicated commercial purposes. Another disadvantage of the corona process is the production of harmful $NO_x$ otherwise known as nitrogen oxides.

Other than the aforementioned electric discharge process, there is no other commercially exploited process for producing large quantities of $O_3$.

However $O_3$ may also be produced by the electrolytic process, wherein an electric current (normally D.C.) is impressed across electrodes immersed in an electrolyte, i.e., electrically conducting, fluid. The electrolyte includes water, which, in the process dissociates into its respective elemental species, $O_2$ and $H_2$. Under the proper conditions, the oxygen is also evolved as the $O_3$ species. The evolution of $O_3$ may be represented as:

It will be noted that the $\Delta H°$ in the electrolytic process is many times greater than that for the electric discharge process. Thus, the electrolytic process appears to be at about a six-fold disadvantage.

More specifically, to compete on an energy cost basis with the electric discharge method, an electrolytic process must yield at least a six-fold increase in ozone. Heretofore, the necessary high yields have not been realized in any forseeably practical electrolytic system.

The evolution of $O_3$ by electrolysis of various electrolytes has been known for well over 100 years. High yields up to 35% current efficiency have been noted in the literature. Current efficiency is a measure of ozone production relative to oxygen production for given inputs of electrical current, i.e., 35% current efficiency means that under the conditions stated, the $O_2/O_3$ gases evolved at the anode are comprised of 35% $O_3$ by weight. However, such yields could only be achieved utilizing very low electrolyte temperatures, e.g., in the range from about −30° C. to about −65° C. Maintaining the necessary low temperatures, obviously requires costly refrigeration equipment as well as the attendant additional energy cost of operation.

Ozone, $O_3$, is present in large quantities in the upper atmosphere in the earth to protect the earth from the suns harmful ultraviolet rays. In addition, ozone has been used in various chemical processes, is known to be a strong oxidant, having an oxidation potential of 2.07 volts. This potential makes it the fourth strongest oxidizing chemical known.

Because ozone has such a strong oxidation potential, it has a very short half-life. For example, ozone which has been solubilized in waste may decompose in a matter of 20 minutes. Ozone can decompose into secondary oxidants such as highly reactive hydroxyl (OH•) and peroxyl (HO$_2$•) radicals. These radicals are among the most reactive oxidizing species known. They undergo fast, non-selective, free radical reactions with dissolved compounds. Hydroxyl radicals have an oxidation potential of 2.8 volts (V), which is higher than most chemical oxidizing species including $O_3$. Most of the OH• radicals are produced in chain reactions where OH• itself or HO$_2$• act as initiators.

Hydroxyl radicals act on organic contaminants either by hydrogen abstraction or by hydrogen addition to a double bond, the resulting radicals disproportionate or combine with each other forming many types of intermediates which react further to produce peroxides, aldehydes and hydrogen peroxide.

Electrochemical cells in which a chemical reaction is forced by added electrical energy are called electrolytic cells. Central to the operation of any cell is the occurrence of oxidation and reduction reactions which produce or consume electrons. These reactions take place at electrode/solution interfaces, where the electrodes must be good electronic conductors. In operation, a cell is connected to an external load or to an external voltage source, and electric charge is transferred by electrons between the anode and the cathode through the external circuit. To complete the electric circuit through the cell, an additional mechanism must exist for internal charge transfer. This is provided by one or more electrolytes, which support charge transfer by ionic conduction. Electrolytes must be poor electronic conductors to prevent internal short circuiting of the cell.

The simplest electrochemical cell consists of at least two electrodes and one or more electrolytes. The electrode at which the electron producing oxidation reaction occurs is the anode. The electrode at which an electron consuming reduction reaction occurs is called the cathode. The direction of the electron flow in the external circuit is always from anode to cathode.

Recent ozone research has been focused primarily on methods of using ozone, as discussed above, or methods of increasing the efficiency of ozone generation. For example, research in the electrochemical production of ozone has resulted in improved catalysts, membrane and electrode assemblies, flowfields and bipolar plates and the like. These efforts have been instrumental in making the electrochemical production of ozone a reliable and economical technology that is ready to be taken out of the laboratory and placed into commercial applications.

However, because ozone has a very short life in the gaseous form, and an even shorter life when dissolved in water, it is preferably generated in close proximity to where the ozone will be consumed. Traditionally, ozone is generated at a rate that is substantially equal to the rate of consumption since conventional generation systems do not lend themselves to ozone storage. Ozone may b stored as a compressed gas, but when generated using corona systems the pressure of the output gas stream is essentially at atmospheric pressure. Therefore, additional hardware for compression of the gas is required, which in itself reduces the ozone concentration through thermal degradation. Ozone may also be dissolved in liquids such as water but this process generally requires additional equipment to introduce the ozone gas into the liquid, and at atmospheric pressure and ambient temperature only a small amount of ozone may be dissolved in water.

Because so many of the present applications have the need for relatively small amounts of ozone, it is generally not cost effective to use conventional ozone generation systems such as corona discharge. Furthermore, since many applications require either ozone gas to be delivered under pressure or ozone dissolved in water as for disinfection, sterilization, treatment of contaminants, etc., the additional support equipment required to compress and/or dissolve the ozone into the water stream further increases system costs. Also, in some applications, it is necessary to maximize the amount of dissolved ozone in pure water by engaging ozone gas in chilled water under pressure. This mode of operation can minimize the amount of pure water required to dissolve a large amount of ozone. Such highly concentrated aqueous solutions of ozone can be added to a stream of process water to maintain a desired concentration of ozone in the process water stream.

Therefore, there is a need for an ozone generator system that operates efficiently on standard AC or DC electricity and water to deliver a reliable stream of ozone gas that is generated under pressure for direct use in a given application. Still other applications would benefit from a stream of highly concentrated ozone that is already dissolved in water where it may be used directly or diluted into a process stream so that a target ozone concentration may be achieved. It would be desirable if the ozone generator system was self-contained, self-controlled and required very little maintenance. It would be further desirable if the system had a minimum number of moving or wearing components, a minimal control system, and was compatible with low voltage power sources such as solar cell arrays, vehicle electrical systems, or battery power.

SUMMARY OF THE INVENTION

The present invention provides an ozone generating and delivery system that includes one or more electrolytic cells comprising an anode and a cathode. The system also includes an anode reservoir in fluid communications with the anode. The anode reservoir may comprise a water inlet and outlet port(s) for filling the reservoir with fresh water and discharging ozone saturated water. The anode reservoir may comprise a hydrophobic membrane at the top of the reservoir to allow ozone and oxygen gas to escape the anode reservoir while water is retained within the reservoir. The anode reservoir may be in thermal communication with a cooling member, such as a thermoelectric device, mechanical refrigeration unit or heat sink, for removing waste heat from the system. The anode is preferably in direct contact with the water in the anode reservoir allowing the free exchange of water with the reservoir and the transmission of gas from the anode to the anode reservoir. A water source providing deionized, reverse osmosis, distilled or other suitable water supply may be placed in fluid communication with the anode reservoir, preferably through a backflow prevention device. Alternatively, the anode may be operated in a self pressurizing mode so that when the anode pressure is momentarily relieved, the pressure of the water source is allowed to overcome the anode pressure and fill the anode reservoir with water, after which the anode relief is closed and the anode is again self pressurized through the generation of gas. The anode reservoir pressure may be held above the pressure of the water source by using a backflow prevention device or valve between the water source and the anode reservoir. In this manner, the pressure within the anode reservoir may be elevated to any desired pressure up to the design pressure of the hardware.

The ozone generator system may comprise: one or more electrolytic cells comprising of an anode and cathode; a power supply electronically coupled to the electrolytic cells; a battery back-up to the electrolytic cells to improve the lifetime of the anode electrocatalyst and provide rapid response to ozone demand; an anode reservoir in fluid communication with the anode and an anode gas releasing mechanism consisting of a porous hydrophobic membrane; a cathode in fluid communication with a cathode gas releasing mechanism consisting of a porous hydrophobic membrane; a recycle line for returning cathode water to the anode; and a cooling member for removing waste heat from the system.

Another aspect of the invention provides a waste gas destruction system which utilizes a catalyst to combine the hydrogen with oxygen from the air to consume the hydrogen without a flame and generate waste heat. In addition to other processes which may utilize this high-grade, contaminant free, waste heat, this hydrogen destruct system may be in thermal communication with an ozone destruction system comprising of a catalyst suitable for the conversion of ozone into diatomic oxygen.

In another aspect of the invention, a process for generating and delivering ozone is provided comprising the steps of: electrolyzing water in one or more electrolytic cells to generate a combination of oxygen and ozone at the anode and hydrogen at the cathode; utilizing a natural means of circulation, such as gas lift, gas forced and thermal, to circulate water between reservoirs and the electrolytic cells; separating the ozone/oxygen gas from the anode water using a porous hydrophobic membrane; receiving hydrogen gas and water from the cathode; phase separating the hydrogen from the cathode water; returning the water originally transferred from the anode to the cathode through electroosmosis back to the anode; separating and discharging the hydrogen gas using a porous hydrophobic membrane which eliminates the requirements for mechanical valves or a control system; adding water to the anode on a continuous or periodic basis to maintain the water supply, self pressurizing the system allowing the delivery of a pressurized oxygen/ozone, hydrogen, and oxygen/ozone saturated water. Other beneficial steps may be taken, including: operating the system at elevated pressures to dissolved higher levels of ozone into solution, and to deliver ozone gas and ozonated water under pressure to eliminate further pumping; removing waste heat from the system and lowering the system temperature to dissolve more ozone in the water and increase the ozone lifetime; destroying the surplus ozone and hydrogen so that the system may be operated in an enclosed environment without necessitating venting; using the waste heat from the hydrogen destruction to enhance the catalytic destruction of the ozone; and/or utilizing the high grade waste heat from the entire gas destruct unit to provide heating to another process.

BRIEF DESCRIPTION OF THE DRAWINGS

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
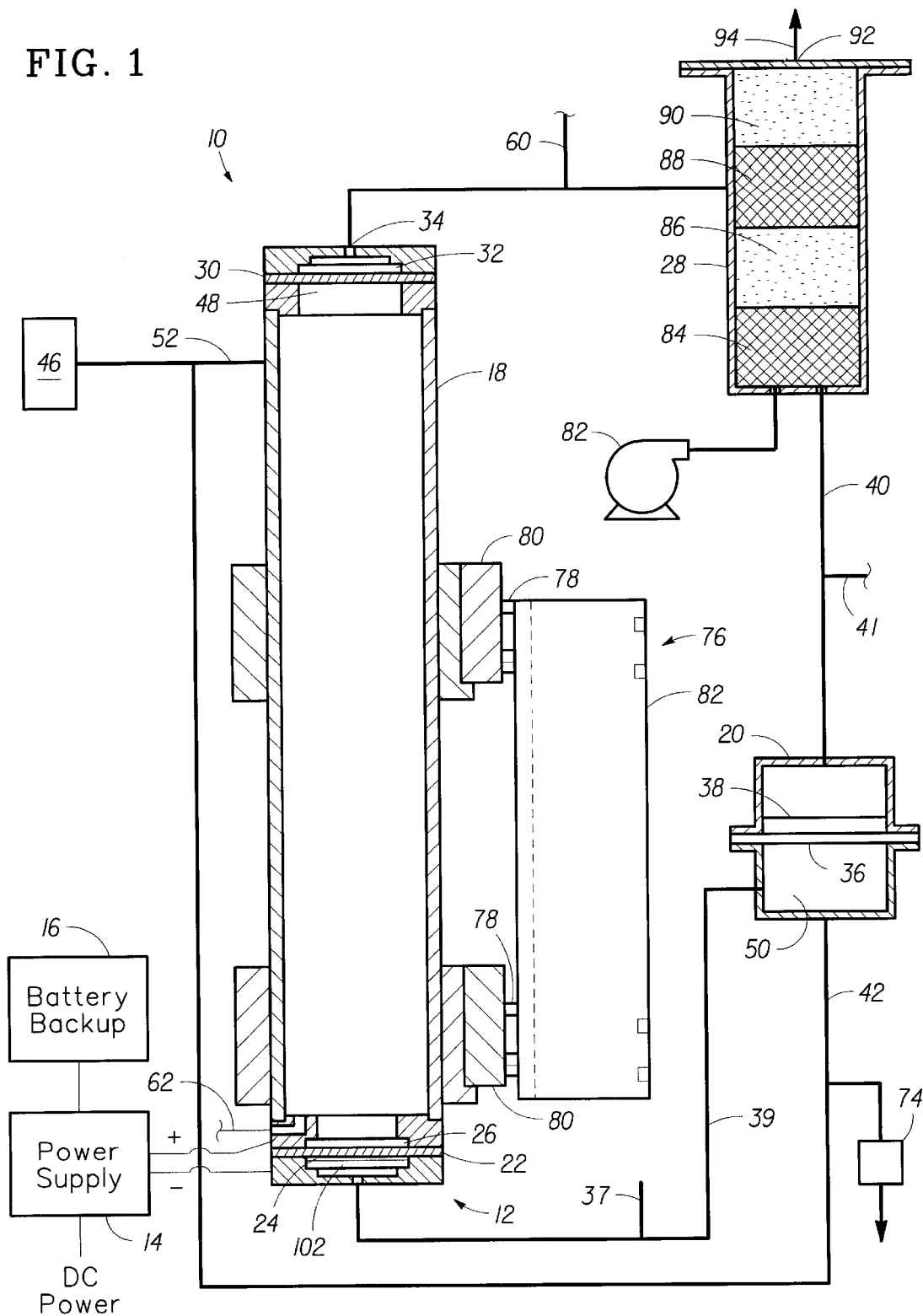
FIG. 1 is a schematic diagram of an entirely passive ozone generation and delivery system which operates solely on water and a source of electrical power.

The present invention provides an ozone generation and delivery system that lends itself to small scale applications. While the present ozone generators may also be made quite large, the generators may be made quite small and compact for point-of-use production of ozone. The ozone generators are simple to operate and require very low maintenance.

In one aspect of the invention, an anode reservoir is provided with a hydrophobic membrane to allow phase separation of the oxygen and ozone gases produced at the anode from water. The hydrophobic membrane eliminates the need for a complicated system of valves and level indicators, thereby reducing potential breakdowns and maintenance. Another benefit of using hydrophobic membranes in the anode reservoir is that the reservoir may be completely full of water, thereby making the most efficient use of the size of the reservoir. The hydrophobic membranes used in the present invention include any membrane that is ozone resistant, gas permeable and water resistant. Examples of useful hydrophobic membranes include porous polytetrafluoroethylene (PTFE) and porous metals or ceramics impregnated with fluorinated polymers.

In another aspect of the invention, a cathode phase separator is provided with a hydrophobic membrane to allow phase separation of hydrogen gas produced at the cathode from water electroosmotically transported to the cathode. The hydrophobic membrane is disposed in the cathode phase separator above the hydrogen-containing water coming from the cathode. The cathode phase separator may be located independent of the electrolytic cell(s) or anode reservoir, thereby providing flexibility in the configuration and dimensions of the overall system.

In yet another aspect of the invention, the anode reservoir may be coupled to the anode so that the face of the anode is in direct fluid communication with the anode reservoir and water and gases may flow freely therebetween. Direct fluid communication allows the ozone produced at the anode to pass into the anode reservoir without passing through a system of tubes and manifolds which inherently cause the coalescence of ozone bubbles. The formation and separation of micro-bubbles at the anode enhances the dissolution of ozone into the anode water and increases the ozone storage capacity of the anode reservoir. An additional advantage of coupling the anode directly to the anode reservoir is the efficient removal of waste heat from the anode. The anode is cooled by natural circulation caused by the rising gas bubbles and, consequently, the system does less damage to the ozone gas than forced circulation methods utilizing pumps.

In a further aspect of the invention, the anode reservoir may provide an ozone containing as, a water stream containing high concentrations of ozone, or both. If the anode reservoir is intended to deliver both streams, the ozone containing gas is obtained above the hydrophobic membrane near the top of the anode reservoir and the water stream containing ozone is withdrawn near the bottom of the anode reservoir adjacent the anode where the ozone concentration is the greatest. If only ozone gas is required, the size of the anode reservoir may be minimized in accordance with fluctuations in ozone demand.

Another aspect of the invention provides for hydrogen gas, ozone gas and/or water containing ozone to be delivered under pressure without the use of pumps. In an entirely passive system, a water source communicates freely with the anode reservoir and cathode phase separator so that hydrogen gas, ozone gas and water containing ozone may be delivered at the same pressure as the water source. The passive system has no moving parts and requires extremely low maintenance. If higher pressures are desired, a self-pressurizing system may be used in which the low pressure water source is protected by a backflow prevention device and the ozone gas outlet from the anode reservoir includes a pressure control device. The output pressures of the ozone gas and hydrogen gas are independent of each other up to a common maximum pressure.

Yet another aspect of the invention provides an anode reservoir that effectively scrubs ozone from the anode gas. The warmer make-up water source is preferably introduced into the top of the anode reservoir, thereby establishing a temperature gradient (high temperature at the top and low temperature at the bottom) and an ozone saturation gradient (high concentration ozone at the bottom and fresh water at the top). The coldest water located at the bottom of the reservoir adjacent the anode will maintain the highest concentrations of ozone and is provided with the first opportunity to capture ozone from the bubble stream. The water added to the top of the anode reservoir is only allowed to capture ozone that cannot be utilized by the water there below which will be the first water to be delivered to an ozone consuming process.

Still another aspect of the invention provides a unique gas destruct system which can destruct waste hydrogen and/or ozone. The hydrogen is mixed with oxygen (or air) and passed over a hydrogen destruction catalyst producing heat. The hot gases, including excess oxygen may then be combined with waste ozone and passed downstream over an ozone destruction catalyst. Since there the ozone generator continuously produces hydrogen, the heat from the hydrogen destruction maintains the ozone catalyst at elevated temperatures to make more active and continuously dry the ozone destruct catalyst material. In this manner, the ozone destruct catalyst is maintained in a ready state for the destruction of ozone. Alternatively, the hydrogen destruct can provide high grade heat which may be used in other, unrelated processes, such as domestic hot water heating.

The present invention provides an ozone generator that is useful for the on-site generation and delivery of ozone that can be provided at a rate that accommodates a constant or variable demand for ozone. The ozone generator may be operated in a batch mode where the short term demand for ozone is significantly higher than the maximum ozone production rate of the electrochemical cell, but the demand is periodic. In such cases, where the average daily demand is comparable to the average daily production, the system may dissolve sufficient amounts of ozone in the water so that when ozone is required for the related process it may be provided in a highly concentrated form and diluted down as it is injected into the process stream. The ozone generators of the present invention may provide the process with a water stream containing a high concentration of dissolved ozone, a high weight percent ozone gas stream, or ozone in both forms.

The ozone generator includes one or more electrolytic cells comprising an anode, a cathode, and a proton exchange membrane (PEM) disposed between the anode and cathode. The PEM is not only proton conducting, but also electronically insulating and gas impermeable to maintain separation of ozone and oxygen gases generated at the anode from hydrogen or other gases generated at the cathode. The preferred PEM is a perfluorinated sulfonic acid polymer, available as NAFION from Du Pont de Nemours, Wilmington, Del.

The ozone generator also comprises an anode reservoir in fluid communication with the anode and having a means of separating the ozone and oxygen gases from liquid water. The anode reservoir is preferably positioned to provide the free flow of water from the anode reservoir to the anode and the free flow of water, oxygen gas, and ozone gas from the anode to the anode reservoir. It is also preferred that the anode and anode reservoir be suitably designed and oriented such that this free flow of water is further driven by processes occurring as a result of normal operation, such as the natural circulation of water due to thermal gradients and the rising of gas bubbles as they are generated within the anode. When the required use is the production of ozone saturated water, the fluid communication between the anode and anode reservoir is designed to minimize the coalescence of the small ozone gas bubbles. Maintaining small sized ozone gas bubbles maximizes the surface area of the bubbles, hence, giving rise to enhanced contacting with water in the anode reservoir.

The anode reservoir further comprises a porous hydrophobic membrane placed in such a manner that it provides phase separation between the oxygen and some of the ozone gas bubbles generated at the anode and dispersed in the water stored in the anode reservoir. The use of this hydrophobic membrane allows the anode reservoir to be in direct communication with a water source to provide a continuously filling anode reservoir and the delivery of ozone gas, oxygen gas, and ozone dissolved in the anode water at the same pressure as the feed water. The water source is preferably in communication with the anode reservoir through small diameter tubing to reduce or eliminate the amount of ozone lost through diffusion out of the system. The preferred porous hydrophobic membranes are made from polytetrafluoroethylene (PTFE), such as GORETEX available from W. L. Gore & Associates, Elkton, Md.

The ozone generation system further comprises a cathode in direct communication with its own phase separation system to allow the hydrogen generated at the cathode to be discharged for use in a secondary process, for venting, or for destruction. The cathode phase separating system may also be placed in fluid communication with the anode reservoir, thereby allowing the water that is transferred from the anode to the cathode through electroosmosis to eventually be returned to the anode. This phase separating system utilizes a porous hydrophobic membrane to allow the free release of hydrogen gas to any pressure below the cathode pressure while retaining the water in the system at pressures equal to or higher than the hydrogen discharge pressure.

While the anode and anode reservoir may be in fluid communication through tubes, such as with a filter press type electrolytic cell stack having a large active cell area, it is generally preferred that the anode be placed in direct fluid communication with the anode reservoir. Direct fluid communication may be achieved by positioning the anode face along the floor or walls of the anode reservoir. Similarly, the cathode may communicate hydrogen and water to the cathode phase separator either through a tube or by placing the cathode phase separator in direct fluid communication with the cathode. Either of these arrangements of the cathode phase separator are suitable. A remote cathode phase separator may be independently located while an integrated cathode phase separator may require fewer parts.

Consequently, it is possible to configure the present invention with either, both or neither of the anode reservoir and cathode phase separator in direct fluid communication with the electrolytic cell. Where both the anode reservoir and cathode phase separator are in direct fluid communication, the system may take on an L-shaped or V-shaped configuration which allows the anode to be positioned face up or sideways to allow ozone bubble separation and the hydrophobic membranes of the anode reservoir and cathode phase separator to be positioned near the top of their respective chambers.

The electrolytic cells preferably generate gas comprising between about 10% and about 18% by weight ozone in oxygen. Such electrolytic cells, including depolarizing electrolytic cells, are described in U.S. Pat. No. 5,460,705 which description is incorporated by reference herein. A fully passive electrolytic cell for producing ozone is most preferred for small scale point of use applications such as point of use water treatment or built into equipment requiring ozone for disinfecting, decontaminating, washing, etc. The absence of moving parts reduces the initial cost of the device and also reduces the potential for failure and the maintenance of the device.

The anode reservoir preferably further comprises a cooling member which cools the water in the anode reservoir. Since the cooled water is in direct communication with the anode, PEM, and in close thermal communication with the cathode, the electrolytic cell may be maintained at a setpoint temperature, preferably below about 35° C., where the cell operates most efficiently, the quantity of ozone dissolved in water is increased over higher temperatures, and the lifetime of the dissolved ozone is extended. Without a cooling member of some type, the heat generated by electrical resistance in the electrolytic cell would increase the temperature of the cell, effecting cell operation and net ozone output. As an additional aspect of this cooling system, the design of the generator system lends itself to solid state coolers, such as thermoelectric devices.

A preferred electrolytic cell uses a proton exchange membrane (PEM), such as a perfluorinated sulfonic acid polymer sheet, in intimate contact between the anode and cathode catalysts. The anode and cathode catalysts are also in intimate contact with porous substrates that make electrical contact with the anode and cathode flowfields, respectively. The flowfields are typically porous metals, such as metal mesh screens or sintered metal particles or fibers, and provide the electrical conduction that is necessary for operation of the electrochemical cell. The anode flowfield is preferably made from a valve metal such as titanium. However, because the valve metals become embrittled from exposure to hydrogen, the cathode flowfield is preferably made from a metal other than the valve metals, such as stainless steel, nickel, copper, or combinations thereof.

It is preferred that the system include a battery backup system to maintain a potential across the electrolytic cell(s) during periods of power loss or idle operation. A preferred battery backup system includes a battery connected to the electrolyzer power supply or, is suitably protected, in parallel with the main supply. Maintaining this potential across the electrolytic cell has been found to increase the life of the lead dioxide electrocatalyst, with experiences a decrease in ozone production capacity following a complete loss of electrical potential. Furthermore, maintaining current through the electrolytic cell(s) also improves the turn on response allowing the system to rapidly come to full output.

A hydrogen destruct unit may be disposed in communication with the hydrogen discharge from the hydrogen phase separator. The hydrogen destruct comprises a catalyst such as a noble metal (e.g., platinum or palladium) in which hydrogen is allowed to combine with oxygen, preferably from free ambient air or forced air, without a flame resulting in the formation of heat and water vapor. Likewise an ozone destruction unit or "ozone destruct" may be disposed in communication with the ozone discharge from the anode reservoir phase separator. The amount of ozone that is produced and separated but not used by some ozone consuming process is catalytically destroyed on contact. The ozone destruct comprises a catalyst, such as $Fe_2O_3$, $MnO_2$, or a noble metal (e.g., platinum or palladium). The operation of this ozone destruct sub-system is further enhanced by placing it in thermal communication with the hydrogen destruct unit. In this manner the waste heat generated by the catalytic combination of hydrogen gas with ambient air and the heat generated from the degradation of ozone to oxygen may be utilized as high grade waste heat. One such example of the utilization of this waste heat would be the distillation of the ozone generation system feed water to improve the water quality. Another application would be the heating of water for use in an unrelated process, such as central heating, clothes washing or domestic hot water.

The electrolyzers of the present invention are capable of efficiently generating both the anode and cathode gasses at elevated pressures. This high pressure capability allows the anode reservoir to build and maintain pressures higher than that of the feed water that is used to fill the anode. This is accomplished by placing a back flow prevention device on the feed water inlet to the anode reservoir and a means of relieving the anode pressure. When the anode pressure is relieved and maintained below that of the source water, feed water free flows into the anode reservoir. When the pressure within the anode reservoir is allowed to build and water not allowed to exit, pressures within the reservoir will rise. Likewise, the cathode system will deliver hydrogen gas at the elevated pressure or below.

Preferably a pressure relief member is provided such that a maximum design pressure is not exceeded. This may be provided only for the liquid or for both the liquid and gas, but should not be provided for the gas alone, since the hydrophobic membrane will not allow water to escape from the anode reservoir. Therefore, an additional aspect of the invention includes a gas chamber that provides a captive gas volume that acts as a volume buffer. When the entire anode reservoir is filled with water and a means of allowing excess water to exit the reservoir is not provided, the volume of captive gas contained in the gas chamber is compressed as gas bubbles are generated by the electrolyzer and expands as these bubbles pass through the phase separator. Ideally this gas chamber is situated and designed such that it is highly unlikely that its gas will be displaced by liquid which would result in a reduced volume of the captive gas chamber. A preferred gas chamber is provided by an inverted U-tube disposed within the cathode and/or anode reservoir. Another particularly preferred gas chamber may be formed by placing a vertical stub in any of the fluid lines in communication with the reservoirs, most preferably located in the fluid line between the cathode and the cathode phase separator so that the captive volume is continuously maintained.

FIG. 1 is a schematic diagram of an entirely passive ozone generation system 10 which operate solely on electricity and water, preferably either deionized, distilled, or reverse osmosis (RO) water. The system 10 includes an ozone generator 12, a power supply 14 and battery backup 16, an anode reservoir 18, a cathode phase separator 20 and a gas destruction unit 28. The ozone generator 12 is preferably an electrolytic cell comprising a proton exchange membrane 22, a cathode 24 with substrate and flowfield and an anode 26 with substrate and flowfield. The anode reservoir 18 comprises an anode gas phase separator membrane 30 and porous support member 32. The anode 26 is provided with water from the anode reservoir 18. The anode catalyst enables the anode 26 to use the water to produce oxygen and ozone a portion of which dissolves into the water in the anode reservoir 18. The anode reservoir 18 also serves as a liquid/gas separator wherein oxygen and ozone generated at the anode 26 forms bubbles or diffuses from the deionized water and rises to the top of the reservoir 18. These gasses pass through the anode phase separator membrane 30, preferably a porous hydrophobic membrane, which is provided with suitable support 32 and flow channel 34 to maintain the integrity of the membrane 30 while the anode reservoir 18 is operated at a desired system pressure.

The cathode 24 is in fluid communication with a cathode phase separator 20 having a porous hydrophobic membrane 36 which is provided with a suitable porous support member 38. Hydrogen gas from the dry side of the membrane 36 is discharged through the support member 38 and through line 40 either to the gas destruct unit 28 or to an unrelated process through line 41. It is preferred that the water that is transferred from the anode 26 to the cathode 24 through electroosmosis be continuously returned from the cathode phase separator 20 to the anode reservoir 18 through a fluid line 42, preferably made of small bore tubing. The fluid line 42 is small in diameter to provide a sufficiently rapid fluid flow from the cathode phase separator 20 to the anode reservoir 18 so that ozone dissolved in the anode water does not diffuse into the cathode phase separator 20.

The hydrophobic phase separators 30, 36 provide a barrier to water in its liquid state, but allow the free transmission of gases such as water vapor, hydrogen gas, oxygen gas, and ozone gas. The separators 30, 36 allow the water source 46 to be placed in direct fluid communication with the anode reservoir 18 so that water will displace any gases in the anode reservoir 18 or cathode phase separator 20 during initial filling and refilling of the anode reservoir. After all the gases are eliminated from the head space 48 of the anode reservoir 18 and the head space 50 of the cathode reservoir 20, then the water will make direct contact with the hydrophobic membranes 30, 36 and the transfer of water will cease as the pressures in the anode reservoir 18 and cathode reservoir 20 equalize with that of the water source 46. Provided that the water pressure in the water source 46 is higher than that in the anode reservoir, the anode reservoir 18 and cathode phase separator 20 will remain full of water during all phases of operation. The water supply line 52 is preferably small in diameter so that ozone dissolved in the anode reservoir water is not allowed to diffuse into the water source 46.

A cooling member 76 is preferably provided for removing waste heat from the system and further chilling the anode reservoir water to decrease degradation of dissolved ozone and increase the ozone saturation limit. A preferred cooling member 76 is shown in FIG. 1 comprising one or more thermoelectric devices 78 in thermal contact with the anode reservoir 18, such as through the thermal heat spreaders 80. The hot reservoirs of the thermoelectric devices 78 are preferably coupled to a heat dissipating member, such as the heat sinks 82 cooled by ambient air. The thermal heat spreaders 80 are provided to increase the surface area for heat transfer through the walls of the anode reservoir 18, especially if the reservoir is made from a plastic or metal having poor heat transfer properties.

The hydrogen generated at the cathode 24 and phase separated by the hydrophobic membrane 36 may be consumed by an unrelated process, stored in a pressure vessel, or, as shown in FIG. 1, directed to a gas destruct system 28. The gas destruct system 28 consists of a source of combustion air 82, a hydrogen-air mixing region 84, a hydrogen destruct region 86 having a hydrogen-air combination catalyst, an air-ozone mixing region 88, and an ozone destruct region containing an ozone destruction catalyst 90. The gas destruct system 28 also includes a port 92 that may be open to the room or atmosphere, or directed to a drain or vent 94. The preferred gas mixing regions 84, 88 will contain a tortuous path, such as that provided by stainless steel wool or other similar material placed upstream of the catalyst, to distribute the gases evenly across the entire face of the catalyst and to provide sufficient mixing of the gas and air. The hydrogen destruct catalyst may be any suitable hydrogen-oxygen combination catalyst, such as the noble metals (platinum or palladium), which may be supported on a ceramic structure, alumina beads or pellets, plated onto a metallic substrate, etc. Likewise, the ozone destruct catalyst may be any catalyst suitable for the decomposition of ozone into oxygen. Suitable catalysts include, but are not limited to, $MnO_2$, $Fe_2O_3$, platinum, etc., or combinations thereof. It is preferred that the hydrogen destruct region 86 be placed upstream and/or in thermal contact with the ozone destruct region 90 allowing the heat generated from the oxidation of hydrogen to assist in the destruction of surplus ozone. Certainly, if gaseous ozone and/or hydrogen can be used for other purposes, such as being supplied to another process, then it is not necessary to destruct either or both gases and the heat provided by the hydrogen destruction may be provided by other sources such as electrical resistance heaters, or the ozone destruct may be operated at room temperature, etc.

Figure 2:
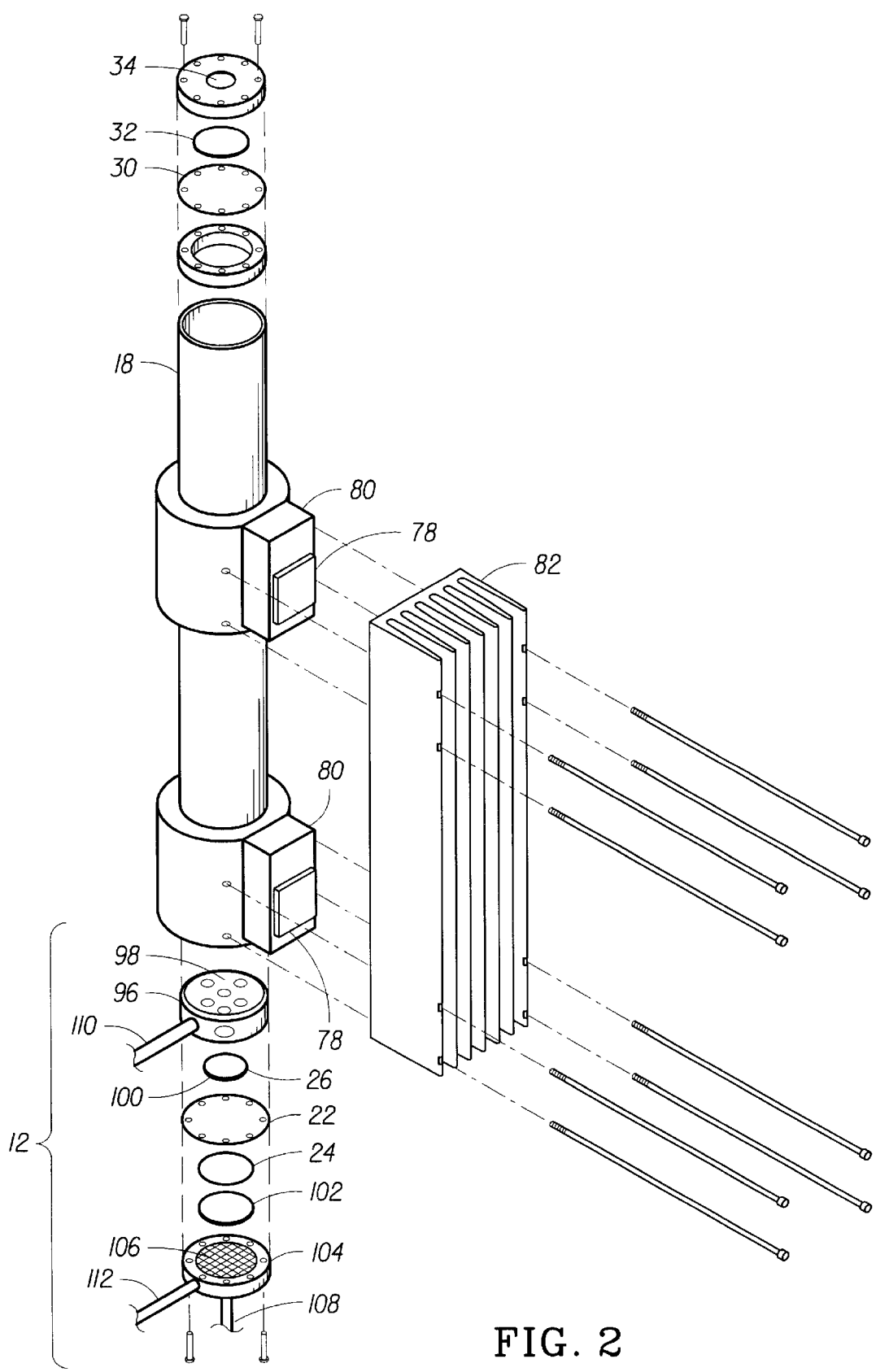
FIG. 2 is an exploded schematic diagram of an electrochemical cell with the anode forming the floor of the anode reservoir.

FIG. 2 is a detailed schematic diagram of a preferred anode reservoir 18 and electrochemical cell 12 for systems having an anode 26 and cathode 24 with an active catalyst area of tens of square centimeters or less. The lower end of the anode reservoir 18 is fitted with a framing member 96 having a metal mesh 98 having large openings therein which allow the free passage of water and gas bubbles. The metal mesh provides mechanical support and electrical contact to the anode porous flowfield 26. The anode flowfield 26 has a catalyst surface 100, preferably a lead dioxide catalyst, deposited on the face of the flowfield 26 contacting the membrane 22. The catalyst surface 100 is in direct contact with the proton exchange membrane 22 which is in turn in direct contact with the cathode catalyst 24. The cathode catalyst 24 is provided with mechanical support and electrical contact in the form of a porous frit 102 which is in turn provided with a support from the end cap 104 having a flowfield 106 therein and a fluid connection 108. Hydrogen and water formed a the cathode 24 leave the cell 12 through the fluid connection 108. Electrical connections 110 and 112 provide current to the anode and cathode respectively.

Figure 3:
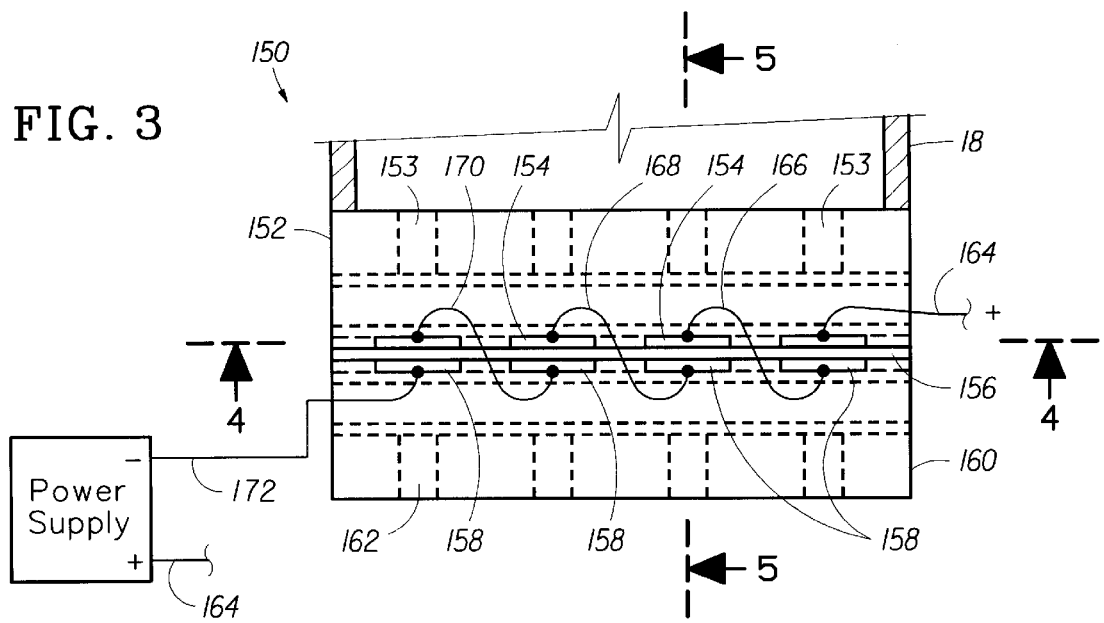
FIG. 3 is a cross-sectional view of an alternate electrochemical cell having multiple anodes and cathodes positioned side by side while being wired electrically in series.

FIG. 3 is an alternate multiple cell electrolyzer 150 allowing the use of larger active surface areas while maintaining the simplified overall design and low system current. This electrolyzer 150 eliminates the multiple fluid and gas seals as well as most fluid manifolds while minimizing the number of components. The electrolyzer assembly 150 includes an electronically insulating anode support 152 which provides flow channels 153 to multiple anodes 154 which are placed in strips or other similar geometry such that they are provided with fluid connections in parallel or all anodes are exposed to the same anode reservoir 18 while remaining electrically isolated. A single proton exchange membrane 156 is sandwiched between the multiple anodes 154 and the mating cathodes 158. The multiple cathodes 158 are also supported by an electronically insulating cathode plate 160 which provides fluid flow channels 162 and mechanical support while electrically isolating each cathode 158. A first anode 154 is provided with electrical connection 164 and its corresponding cathode is wired to another anode, such as the adjacent anode, with a conductive member 166. The electrical connection of each anode and cathode continues with additional conductors 168, 170 and conductor 172 providing electrical contact to the last cathode.

Figure 4:
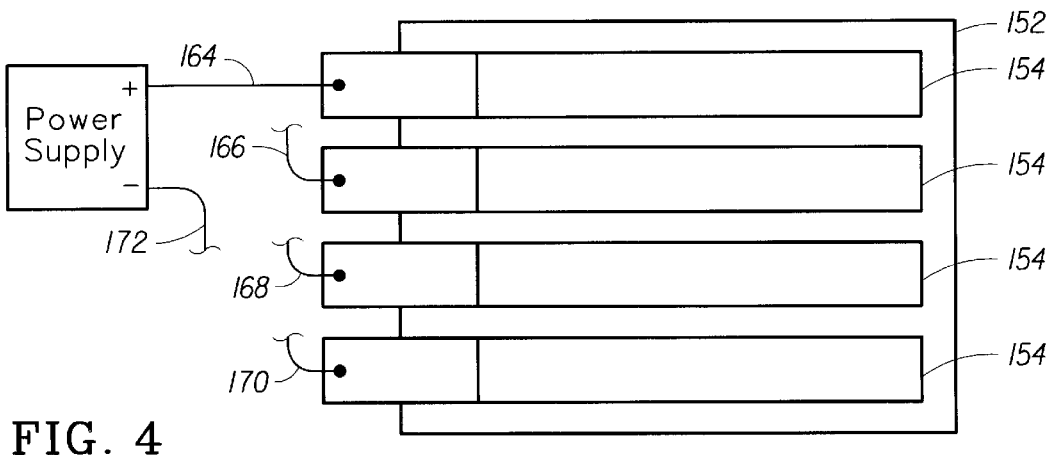
FIG. 4 is a face view of the electrodes and support plate shown in FIG. 3.

FIG. 4 shows a face view that is representative of the anodes 154 and plate 152, where the electrically insulating support plate 152 provides mechanical support and flow channels to the electrically separated anodes 154. FIG. 4 is also representative of the cathodes 158 and plate 160 positioned across the membrane 156 and opposite the anodes 154.

Figure 5:
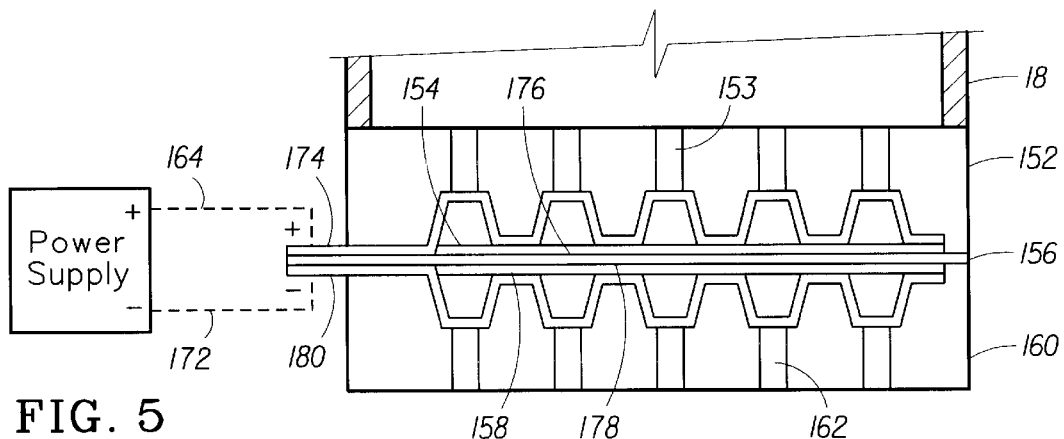
FIG. 5 is a cross-sectional view of the electrolytic cell shown in FIG. 3.

FIG. 5 is a cross-sectional view of the electrolyzer 150 of FIG. 4. The anode support 152 is preferably molded of a thermoplastic that is suitable for use with ozone and provides suitable mechanical support, such as polyvinylidene fluoride (PVDF) available under the trade name KYNAR from Elf Atochem North America, Philadelphia, Pa. An individual anode assembly consists of a nonporous, electrically conductive anode strip 174 which follows the flow field pattern molded into plate 152 and extends past the edge of the plate 152 to facilitate electrical contact. Over this nonporous corrugated strip is placed a porous frit material 154, such as titanium, coated with the anode catalyst 176. The proton exchange membrane 156 is placed over the anode assemblies and the process is repeated with a cathode catalyst 178 backed by a porous frit 158, and a non-porous, electrically conductive cathode strip 180 whose flow field matches that molded into the cathode end plate 160 which is molded from a non-conductive material with suitable chemical and mechanical properties.

The fluid connections which connect the cathode to the cathode phase separator are not shown in FIGS. 3 and 5. Such connections may comprise a member which provides a small chamber that communicates each channel 162 with the fluid line to the cathode phase separator 20. When using the cell 150, the end plate 152 may form a part of the anode reservoir floor or wall and the non-porous conducting strips 174 may be made from perforated metal which allows the free exchange of water and gas through the channels 153 while allowing tight fluid seals where the strips 174 extend past the edge of plate 152 and make electrical connection to a power supply.

Figure 6:
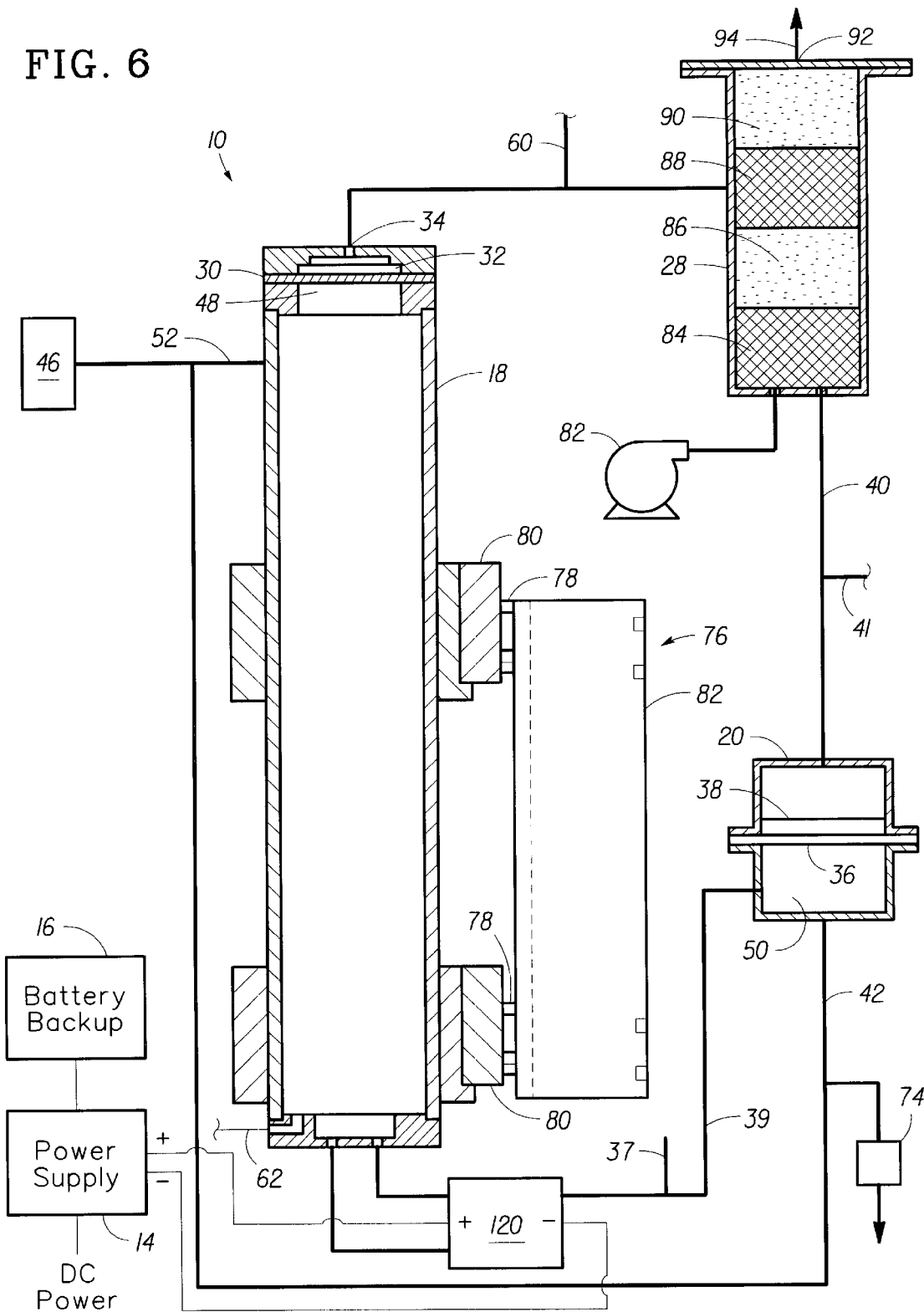
FIG. 6 is a schematic diagram of an entirely passive ozone generation system with an alternative electrochemical cell 120 configured in a filter press type arrangement.

FIG. 6 is a schematic diagram of an ozone generator system of the present invention that is similar to the system of FIG. 1 except that the single cell 12 having anode 26 in direct fluid communication with the anode reservoir 18 has been replaced with an electrolytic cell 120 that is in fluid communication with the anode reservoir 18 and cathode phase separator 20 through tubes. Note that the remainder of the system may be unchanged and may still operate in an entirely passive mode.

Figure 7:
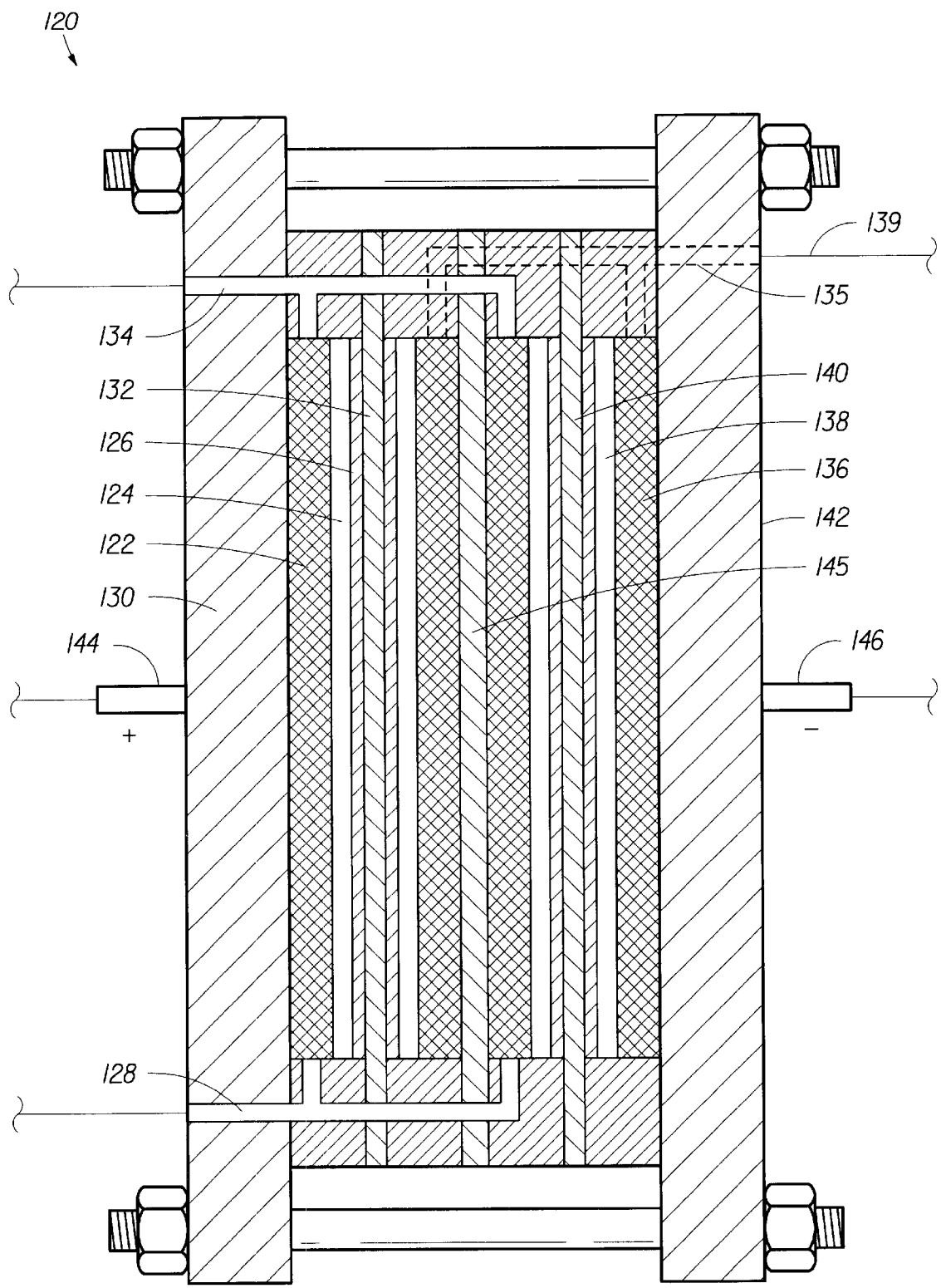
FIG. 7 is a cross-sectional view of the alternative electrochemical cell 120 which is configured in a filter press type arrangement.

FIG. 7 is a schematic diagram of an electrolytic cell 120 that is preferred for providing higher active areas. In such systems, for reasons of simplifying the power supply, it is advantageous to have the system current remain relatively low, yet allow the overall applied voltage to increase. An electrochemical cell stack 120 may be provided in a filter press type arrangement to allow the use of multiple anodes and cathodes placed electrically in series. The stack 120 is provided with water inlet flow channels 128 and water outlet flow channels 134 which deliver fluid to and from each anode flowfield 122, porous anode substrate 124 and anode catalyst 126. An additional water outlet flow channel 135 is preferably disposed along an opposed top edge of the cell so that the channel 135 can communicate with each cathode flowfield 136, cathode substrate 138 and cathode catalyst 140 in a similar manner. An exemplary pair of cells in a stack are shown where fluid connections 128 and 134 provide water to the electrolyzer stack anodes and remove water and bubbles from the anodes. End plate 130 provides fluid and electrical connection to the first anode flowfield 122. The cathode flowfield 136 is provided with electrical contact and mechanical support from another end plate 142 which provides electrical and fluid connections with the second cathode. Alternatively, additional cells may be placed between the cathode flow field 136 and the end plate 142 is separated with an electrically conducting bipolar plate, like bipolar plate 145 which may also provide suitable fluid channels.

Power for the entire assembly is provided through electrical connections 144 and 146. This method of stacking multiple electrochemical cells in series has the distinct advantage of increasing the applied voltage while allowing the system current to remain a function of the active area of each cell rather than of the total active area. Additional description of this stack arrangement is detailed in U.S. Pat. No. 5,460,705 which is incorporated herein by reference.

Figure 8:
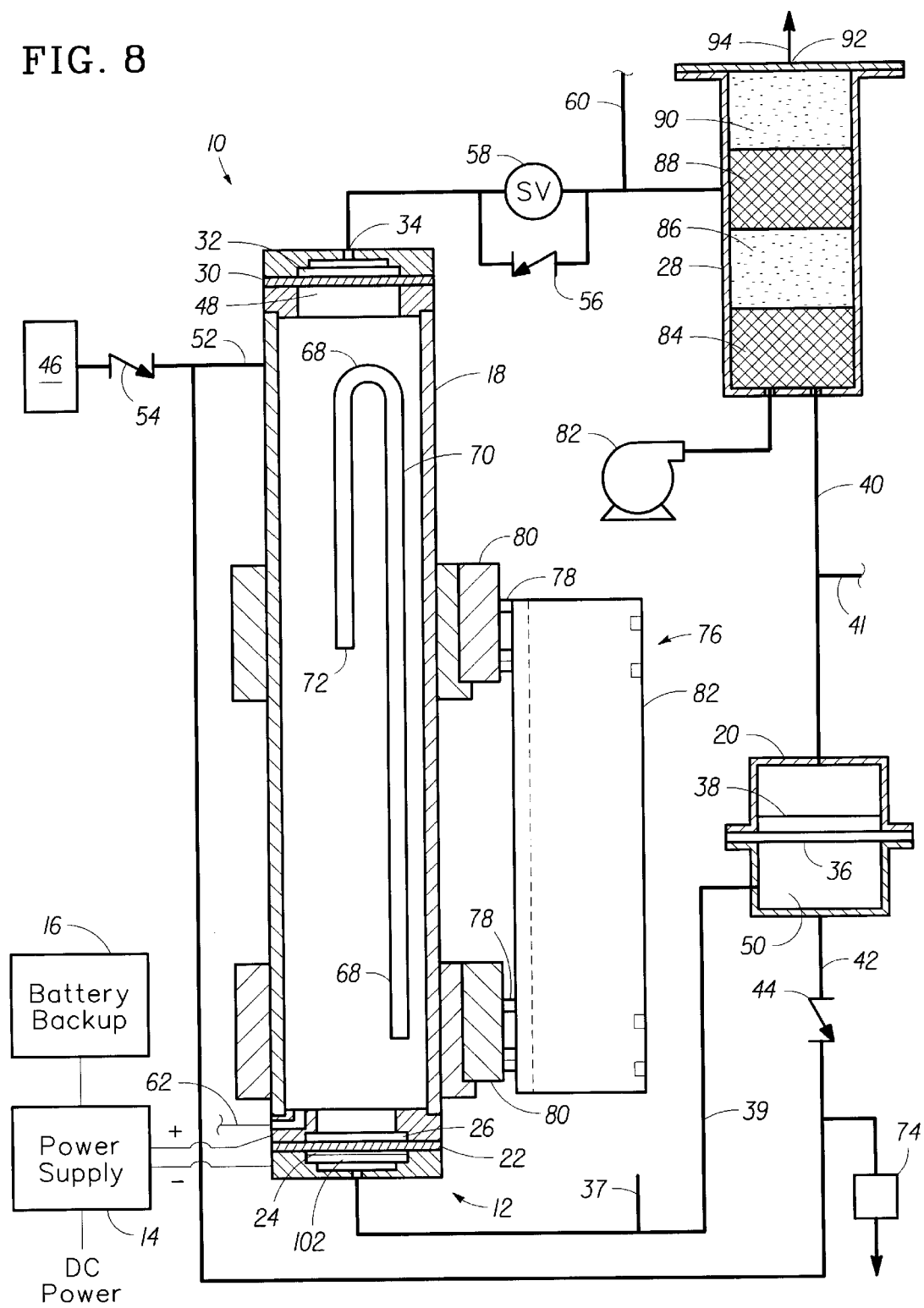
FIG. 8 is a schematic diagram of a self-pressurizing ozone generation and delivery system.

FIG. 8 is a schematic diagram of a self-pressurizing ozone generator system. If the desired delivery pressure from the ozone generating system 10 is higher than that of the water source 46, then the system 10 may be operated in a self pressurizing mode with the addition of backflow prevention device 54, a back pressure regulating device 56 and pressure relief solenoid valve 58. Alternatively, these two components 56, 58 may be combined into a single solenoid valve that is designed with a suitable orifice and closing force so that the single solenoid valve is forced open by the gas pressure when the desired system pressure is reached. This alternate valve will then maintain the system pressure at or near the cracking pressure of the valve.

To fill the anode reservoir 18 with water in the self-pressurizing system, the pressure in the anode reservoir 18 is relieved by opening the pressure relief solenoid valve 58. When the anode reservoir pressure drops below the water source pressure, water is allowed to flow freely from the water source 46 into the anode reservoir 18. Water is allowed to enter the anode reservoir 18 over a suitable period of time or until a sufficient amount of water is indicated. The pressure relief valve 58 is then closed and the pressure within the anode reservoir rises as gas is formed at the anode and confined within the anode reservoir 18. The back pressure regulator 56 or high cracking pressure solenoid valve 58 described earlier, operate to maintain the desired working pressure. This system is sufficient for regulating the pressure of either ozone gas being delivered to an ozone gas consuming process through line 60, ozonated water being delivered to an ozonated water consuming process through line 62, or hydrogen gas being delivered through line 41. Alternatively, this pressure control system 56, 58 may be eliminated if suitable control is provided by an ozone consuming process (not shown). It should be recognized that any number of suitable methods of maintaining and relieving the system pressure could be devised by someone skilled in the art.

The anode reservoir 18 or cathode phase separator 20 may also be provided with a means of preventing hydrostatic pressures from increasing to catastrophic values during periods when all gases are eliminated from the anode reservoir 18 and the cathode phase separator 20. During these periods of time, the bubbles formed at the anode and cathode must displace a portion of the water that is in the already full anode reservoir 18 and cathode phase separator 20. The additional system volume required by these bubbles may be provided by a captive gas system 66, such as an inverted U-tube 70 whose ends 68, 72 are situated so as to provide a gas chamber 66 during initial filling of the anode reservoir 18. Any number of equivalent methods of pressure relief from the liquid side of the membrane, including conventional pressure relief valves, may be envisioned. However, the simple gas chamber 66 is preferred, because it is unlikely to fail, involves no machining or welding, and may be placed in either the anode reservoir or cathode phase separator during fabrication. The U-tube 70 may be supported by allowing the bottom of the long leg 68 to rest near the bottom of the anode reservoir 18. The short leg 70 allows the gas chamber 66 to be re-established each time the water level in the anode reservoir 18 drops below the level of the opening 72. More preferably, the captive gas system may comprise a gas trap 37 in fluid line 29 or any fluid line in communication with the anode reservoir 18. Additionally, a safe-failing over pressure device such as a rupture disk 74 may be included to prevent equipment damage should the normal methods of pressure relief fail. Alternatively, the natural breakthrough pressure of the hydrophobic membranes may be used to prevent catastrophic failures due to overpressure within the system.

EXAMPLE

An ozone generator was designed in accordance with FIGS. 1 and 2 to produce about 5 mg/min of ozone and deliver this as water saturated with ozone under pressure yielding at least 100 mg of ozone per liter of water. A single electrolyzer cell was used having an active area of approximately 5 $cm^2$ which stores and delivers 750 ml of water containing 75 mg of dissolved ozone. The anode reservoir was fabricated from titanium tubing 2 inches in diameter and approximately 16 inches long and machined titanium end caps were welded in place. The top end cap had provisions for bolting on a membrane support assembly and a suitable porous hydrophobic membrane was placed between the titanium end cap and a stainless steel membrane support and flow field assembly. The phase separating membrane used was a porous PTFE material available from W. L. Gore and Associates. The end cap welded to the lower end of the anode reservoir was machined to make an open area which provided support for a sintered titanium flowfield coupled to the positive pole of a power source. The side or edge of this end cap included a fitting and a flow channel allowing fluid communication between the anode reservoir and a drain for draining the reservoir. The fitting and flow channel are positioned slightly above the anode so that the anode reservoir cannot be completely drained, thereby reducing the possibility of the anode running dry. The PEM was a sheet of perfluorinated sulfonic acid polymer, specifically NAFION® obtained from Du Pont de Nemours, Wilmington, Del. The cathode electrocatalyst was provided by a carbon fiber paper impregnated with a platinum catalyst at a loading of between about 0.1 and about 1 mg/$cm^2$. the fiber paper was placed against the second side of the PEM. The cathode flowfield, consisting of a sintered stainless steel frit, was placed in contact with the other side of the carbon fiber paper to provide mechanical support and electrical connection to the cathode catalyst. A stainless steel cap was then bolted to the bottom of the assembly. This end cap provided sealing, flow channels, fluid connections, and electrical connections to the cathode.

The cathode discharge was connected to a second phase separator separate from the anode reservoir and electrolyzer assembly. This second phase separator consisted of a commercially available, 47 mm filter holder molded from polytetrafluoroethylene (PTFE), but any other suitable commercial or custom system would be adequate. The same porous Gore membrane used in the anode phase separator was used in the cathode phase separator. The liquid connection of the cathode phase separator was connected to the anode reservoir using a few feet of ⅛" Teflon tubing. The hydrogen connection of the cathode phase separator was connected to the hydrogen destruct using ¼" vinyl tubing obtained under the trade name TYGON from U.S. Stoneware Co., Akron, Ohio.

The gas destruct unit was fabricated from a piece of ½" diameter stainless steel tubing approximately 9 inches long and having two tubing connections, one at the bottom and one midway along its length. This was packed with approximately 2 inches of stainless steel wool followed by 3 inches of platinum coated alumina pellets. The region from approximately 1 inch below the side inlet to 2 inches above the side inlet was packed with stainless steel wool to provide mixing of the ozone with the hot gas from the lower hydrogen destruct system. The remaining volume in the top of this tube was filled with $MnO_2$—$Fe_2O_3$ pellets available commercially from Prototech, Inc. of Needham, Mass. Air was provided by a 1 liter per minute diaphragm type air pump such as that available from Apollo Enterprises of Ontario, Calif. The top of the destruct was vented to the atmosphere.

Thermal management was provided by two thermoelectric devices, such as model PT6-12-40 commercially available from Melcor of Trenton, N.J. To increase the thermal contact area two aluminum cylinders were tightly clamped to the outside of the titanium tubing, a flat was milled to each cylinder, and one thermoelectric was mounted to each flat. A finned aluminum heat sink was mounted to the hot junction of the thermoelectrics allowing waste heat to be transferred to the ambient air. A freeze protection switch was placed in series with the thermoelectric power source. This bimetallic switch opens in the event that the anode reservoir temperature falls close to freezing, turning the thermoelectrics off until the temperature increases above the hysteresis range of the switch.

While the foregoing is directed to the preferred embodiment of the present invention, other and further embodiments of the invention may be devised without departing from the basic scope thereof, and the scope thereof is determined by the claims which follow.

What is claimed is:

1. A waste gas destruction unit for an electrochemical system producing ozone and hydrogen gases, comprising:
    a first region comprising a hydrogen inlet, an oxygen source inlet and a tortuous packing;
    a second region downstream of the first region, the second region comprising a hydrogen destruction catalyst,
    a third region downstream of the second region, the third region comprising an ozone inlet and a tortuous packing; and
    a fourth region downstream of the third region, the fourth region comprising an ozone destruction catalyst and a vent.

2. The waste gas destruction unit of claim 1, wherein the hydrogen destruction catalyst is in thermal communication with the ozone destruction catalyst.

3. The waste gas destruction unit of claim 2, wherein heat from the hydrogen destruction catalyst enhances the catalytic destruction of the ozone in the ozone destruction catalyst.

4. The waste gas destruction unit of claim 1, wherein the hydrogen destruction catalyst is in thermal communication with an unrelated system.

5. The waste gas destruction unit of claim 1, wherein the ozone inlet is in fluid communication with an ozone electrolyzer, wherein the ozone destruction catalyst destroys surplus ozone from the electrolyzer and the hydrogen destruction catalyst destroys surplus hydrogen from the electrolyzer.

6. The waste gas destruction unit of claim 5, wherein the ozone and hydrogen destruction units allow the system to be operated in an enclosed environment.

7. The waste gas destruction unit of claim 1, wherein the waste gas destruction unit provides heating to another process.

8. The waste gas destruction unit of claim 1, wherein the hydrogen destruct catalyst is disposed in fluid communication with a hydrogen discharge from a hydrogen phase separator.

9. The waste gas destruction unit of claim 1, wherein the hydrogen destruction catalyst is a noble metal.

10. The waste gas destruction unit of claim 9, wherein the noble metal is platinum or palladium.

11. The waste gas destruction unit of claim 1, wherein the oxygen source inlet provides ambient air or forced air.

12. The waste gas destruction unit of claim 1, wherein the hydrogen destruction catalyst destroys hydrogen without a flame to form heat and water vapor.

13. The waste gas destruction unit of claim 1, wherein the ozone destruction catalyst is disposed in fluid communication with an ozone discharge from an anode reservoir phase separator.

14. The waste gas destruction unit of claim 1, wherein ozone is catalytically destroyed on contact with the ozone destruction catalyst.

15. The waste gas destruction unit of claim 1, wherein the ozone destruction catalyst is selected from the group consisting of $Fe_2O_3$, $MnO_2$, a noble metal, and combinations thereof.

16. The waste gas destruction unit of claim 15, wherein the noble metal is platinum or palladium.

17. The waste gas destruction unit of claim 1, wherein the hydrogen destruction catalyst and the ozone destruction catalyst are in thermal communication with a distillation unit, and wherein heat generated by destruction of hydrogen gas and ozone gas is used for distillation of the ozone generation system feed water.

18. The waste gas destruction unit of claim 1, wherein heat generated by destruction of hydrogen gas and ozone gas is used to heat water.

19. The waste gas destruction unit of claim 1, wherein the vent is open to the atmosphere.

20. The waste gas destruction unit of claim 1, wherein the tortuous packing in the first region comprises stainless steel wool.

21. The waste gas destruction unit of claim 1, wherein the hydrogen destruction catalyst is a catalyst selected from noble metals that may be supported on a ceramic structure, alumina beads or pellets, or plated onto a metallic substrate.

22. The waste gas destruction unit of claim 21, wherein the noble metals are platinum or palladium.

23. The waste gas destruction unit of claim 1, wherein the ozone destruction catalyst is selected from the group consisting of $MnO_2$, $Fe_2O_3$, platinum, and combinations thereof.

24. The waste gas destruction unit of claim 1, wherein the waste gas destruction unit is fabricated from a piece of stainless steel tubing.

25. The waste gas destruction unit of claim 24, wherein the stainless steel tubing has two tubing connections, one at the bottom and one midway along its length.

26. The waste gas destruction unit of claim 1, wherein the hydrogen destruction catalyst comprises platinum coated alumina pellets.

27. The waste gas destruction unit of claim 1, wherein the ozone destruction catalyst comprises $MnO_2$—$Fe_2O_3$ pellets.

28. The waste gas destruction unit of claim 1, wherein the tortuous packing in the third region comprises stainless steel wool.

29. The waste gas destruction unit of claim 1, wherein the hydrogen destruction catalyst and the ozone destruction catalyst are in thermal communication with a distillation unit of an ozone generation system feed water.

* * * * *